United States Patent [19]

Kühl

[11] Patent Number: 4,575,435

[45] Date of Patent: Mar. 11, 1986

[54] PACKING UNIT FOR MASS-TRANSFER COLUMNS

[75] Inventor: Reinhard Kühl, Niederrahr, Fed. Rep. of Germany

[73] Assignee: Vereinigte Füllkörper-Fabriken GmbH & Co., Ransbach-Baumbach, Fed. Rep. of Germany

[21] Appl. No.: 649,689

[22] Filed: Sep. 12, 1984

[30] Foreign Application Priority Data

Oct. 25, 1983 [DE] Fed. Rep. of Germany ....... 8330573

[51] Int. Cl.⁴ .................................................. B01F 3/04
[52] U.S. Cl. ................................ 261/94; 261/DIG. 74
[58] Field of Search .......................... 261/94, DIG. 72

[56] References Cited

U.S. PATENT DOCUMENTS

| | | | |
|---|---|---|---|
| 3,266,787 | 8/1966 | Eckert | 261/DIG. 72 |
| 3,311,356 | 3/1967 | Eckert | 261/DIG. 72 |
| 4,041,113 | 8/1977 | McKeown | 261/DIG. 72 |
| 4,197,264 | 4/1980 | Degg | 261/DIG. 72 |
| 4,303,599 | 12/1981 | Strigle, Jr. | 261/DIG. 72 |

FOREIGN PATENT DOCUMENTS

| | | | |
|---|---|---|---|
| 1098439 | 3/1981 | Canada | 261/DIG. 72 |
| 925374 | 5/1982 | U.S.S.R. | 261/DIG. 72 |
| 990277 | 1/1983 | U.S.S.R. | 261/DIG. 72 |

Primary Examiner—Tim Miles
Attorney, Agent, or Firm—Max Fogiel

[57] ABSTRACT

The present invention relates to a packing unit for mass-transfer columns that consists of a basic flat piece with several parallel and adjacent slits that terminate short of the border on each side. Sections between the ends and the slits and between the slits themselves are bent out in opposing curves. The basic piece has several adjacent strips being connected and their free borders joined.

14 Claims, 2 Drawing Figures

PACKING UNIT FOR MASS-TRANSFER COLUMNS

BACKGROUND OF THE INVENTION

The present invention relates to a packing unit for mass-transfer columns that consists of a basic flat piece with several parallel and adjacent slits that terminate short of the border on each side, with the sections between the ends and the slits and between the slits themselves bent out in opposing curves.

Packing units of this type are known and have proved to be effective in mass-transfer columns. When, however, the packing unit rests with its longitudinal axis horizontal or when it stands vertically, there are relatively few edges available for the liquid to drip from and the gases can flow through the packing unit relatively smoothly. If this is not taken into consideration, the pressure loss will be relatively high and the bordering tendency relatively powerful in packing made out of units of this type.

SUMMARY OF THE INVENTION

The object of the present invention is to provide a packing unit of the aforesaid type that will provide the highest possible number of edges for the liquid to drip from, no matter where the unit is located in the packing and that practically prevents the gases from flowing through the packing without coming into contact with the liquid.

This object is attained in accordance with the invention with a packing unit of the aforesaid type, the basic piece of which consists of several adjacent strips with the facing uncut borders between two adjacent strips being connected and their free borders joined.

A packing unit of this type has practically the same number of webs, apertures, and edges no matter where it is located in the packing, which leads to uniform distribution of gas and liquid throughout the packing. The gases and liquid flowing through the packing accordingly come into very intimate contact and produce satisfactory mass transfer. The pressure drop in packing constructed of units of this type is very slight in spite of the design in accordance with the invention. Bordering is practically non-existent.

The ratio of height to diameter in a packing unit of this type should be about 1:1. This ratio is, however, variable. If a lot of liquid and only a little gas is to flow through the packing, the height should be greater to improve the distribution of the gas through the packing. If, on the other hand, only a little liquid and a lot of gas is to flow through the packing, the height should be less to decrease pressure loss.

To maintain packing with as many edges and as many points for the liquid to drip from as possible, it is practical for the sections that curve to one side or to both sides to have one or more concave curves as viewed from above. It is then possible for the sections that curve to one side or to both sides to have one or more alternating concave curves as viewed from above. It has however turned out to be an advantage for only the sections that curve to one side to have one or more concave curves as viewed from above.

To further elevate the points that the liquid can drip from, the sections between the slits can be partly, preferably alternately, slit through. Specifically, the sections curving to one side, to the other side, or to both sides can be alternately slit through.

The packing unit should consist of a basic flat piece that has at least three adjacent strips curved together at their free borders. It has turned out to be practical for the basic flat piece to have four adjacent strips curved together at their free borders. This results in a parallelepipedal packing unit with a very large number of free edges and dripping points. The borders that are not slit through will then constitute the midlines of the sides of a parallelepiped. If the profiles of the curves on one side as viewed from above have concave curves, the parallel and adjacent concave curves constitute the concavely curved edges of the parallelepipedal packing unit.

The packing unit can be made out of a metallic material.

The height of the packing unit can be greater than its diameter.

The diameter of the packing unit can be greater than its height.

All of the characteristics in the description and claims are essential to the invention both individually and in combination.

A preferred embodiment of the invention will now be described with reference to the attached drawings, wherein

DETAILED DESCRIPTION OF THE PREFERRED EMBODIMENT

Figure 1:
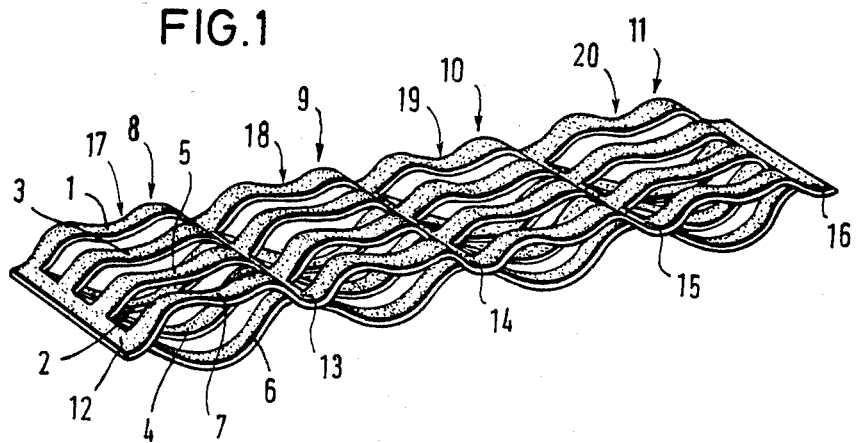
FIG. 1 is a perspective view of a basic flat piece consisting of four strips.

The basic flat piece illustrated in FIG. 1 consists of four adjacent strips 8, 9, 10, and 11, each of which has six parallel and adjacent slits that terminate on both sides just before borders 12, 13, 14, 15, and 16. Each pair of adjacent strips is connected by a border: strips 8 and 9 by border 13, strips 9 and 10 by border 14, and strips 10 and 11 by border 15. The sections 1, 2, 3, 4, 5, 6, and 7 between the ends of each strip 8, 9, 10, and 11 and between the slits in each strip are bent out in a curve, with sections 1, 3, 5, and 7 curving out in a direction opposite that in which sections 2, 4, and 6 curve out. Curved sections 1, 3, 5, and 7, which curve to one side have parallel and adjacent concave curves 17, 18, 19, and 20 in cross-section as viewed from above.

Figure 2:
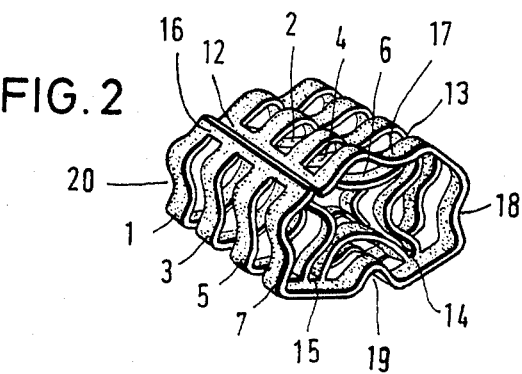
FIG. 2 is a perspective view of a parallelepipedal packing unit made out of a basic flat piece of the type illustrated in FIG. 1.

The basic flat piece illustrated in FIG. 1 is bent into the parallelepipedal packing unit illustrated in FIG. 2. The basic flat piece consisting of four adjacent strips 8, 9, 10, and 11 is curved together at its free borders 12 and 16. The edges 12 in conjunction with 16 and 13, 14, and 15 that are not slit through more or less constitute the midline of the sides of the parallelepipedal packing unit. The sections 1, 3, 5, and 7 with the curves 17, 18, 19, and 20 that are concave as viewed from above curve outward, while the other sections 2, 4, and 6 curve inward and form a cruciform inside area. The curves 17, 18, 19, and 20 of sections 1, 3, 5, and 7 that are parallel and adjacent as viewed from above form in this design the concave inward curving edges of the parallelepipedal packing unit. This design results in a packing unit with a very high number of free edges and hence a very high number of points for liquid to drip from, no matter where it is located in the packing in a mass-transfer column. The pressure loss and the bordering tendency that occurs when a packing unit of this type is employed in a mass-transfer column are relatively slight. A packing unit of this type is accordingly relatively easy to manufacture because it can be stamped out of a metal blank, the curves bent out, and the free edges joined. A packing unit of this type can naturally not only be made out of a metallic material but also out of plastic or other material.

Not all of the sections 1, 3, 5, and 7 or 2, 4, and 6 that are bent out to the side must have a concave curve as viewed from above. It is also possible for only some of the sections 1, 3, 5, and 7 or 2, 4, and 6 that are bent out to the side, alternating sections for example, to have a concave curve as viewed from above. It is also possible for the curves to be on both side. The outwardly curved sections can also be partly, alternately for example, cut through and bent back.

The present specification and claims are of course intended solely as illustrative of one or more potential embodiments of the invention and should not be construed as limiting it in any way. The invention may accordingly be adapted and modified in many ways without deviating from the theory behind it or exceeding its scope of application.

I claim:

1. Packing unit for mass-transfer columns comprising a basic flat member with several parallel and adjacent slits terminating short of the border on each side; sections between ends and said slits and between the slits themselves bent out in opposing curves; said basic member comprising a plurality of adjacent strips, facing uncut borders between two adjacent strips being connected and their free borders being joined.

2. Packing unit as in claim 1, wherein sections curving to one side or to both sides have at least one concave curve when viewed from above.

3. Packing unit in claim 1, wherein sections curving to one side or to both sides have at least one alternating concave when viewed from above.

4. Packing unit as in claim 1, wherein sections curving to one side have at least one concave curve when viewed from above.

5. Packing unit as in claim 1, wherein sections between slits are partly slit through.

6. Packing unit as in claim 5, wherein sections between slits are alternately slit through.

7. Packing unit as in claim 6, wherein sections curving to one side, to the other side, or to both sides are alternately slit through.

8. Packing unit as in claim 1, comprising at least three adjacent strips curved together at their free borders.

9. Packing unit as in claim 8, comprising further four adjacent strips curved together at their free borders.

10. Packing unit as in claim 9, wherein said borders that are not slit through comprise substantially midlines of the sides of a parallelepiped.

11. Packing unit as in claim 10, wherein concave curves that are parallel and adjacent when viewed from above comprise concavely curved edges of the parallelepiped.

12. Packing unit as in claim 1, comprising further metallic material.

13. Packing unit as in claim 1, wherein its height is greater than its diameter.

14. Packing unit as in claim 1, and having a diameter which is greater than its height.

* * * * *